March 21, 1967 JAMES E. WEBB 3,310,256
ADMINISTRATOR OF THE NATIONAL AERONAUTICS
AND SPACE ADMINISTRATION
AERODYNAMIC PROTECTION FOR SPACE FLIGHT VEHICLES
Filed July 27, 1965 3 Sheets-Sheet 1
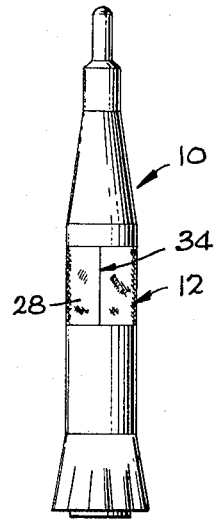
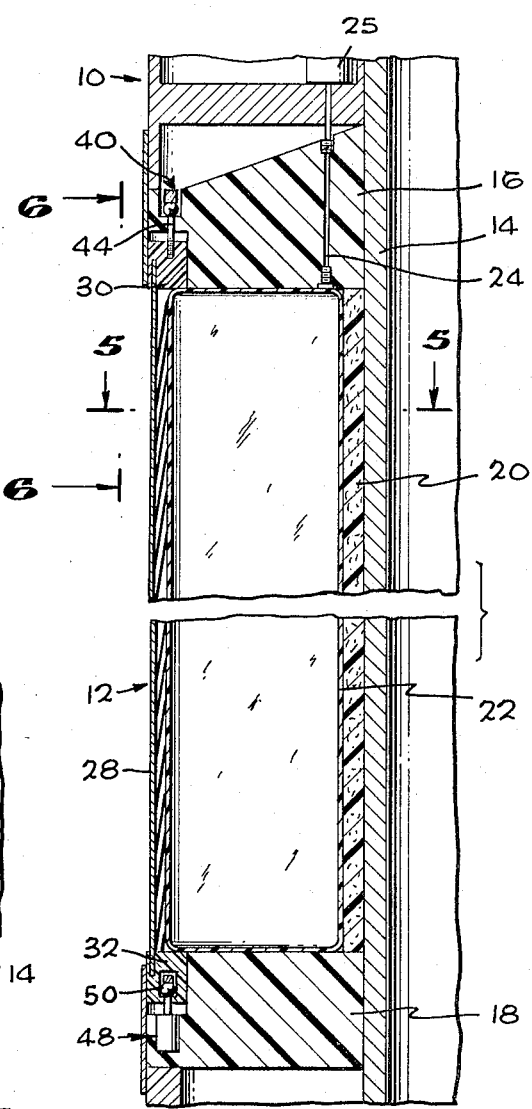
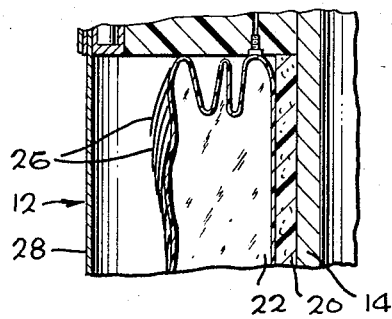
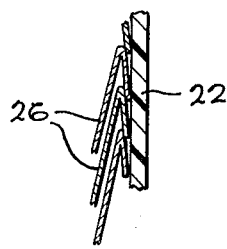
RICHARD T. PARMLEY
INVENTOR.
BY
Charles C. Wells
ATTORNEYS March 21, 1967   JAMES E. WEBB   3,310,256
ADMINISTRATOR OF THE NATIONAL AERONAUTICS
AND SPACE ADMINISTRATION
AERODYNAMIC PROTECTION FOR SPACE FLIGHT VEHICLES
Filed July 27, 1965   3 Sheets-Sheet 2
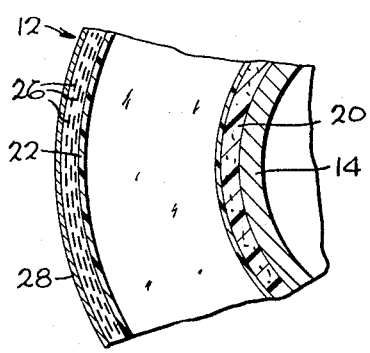
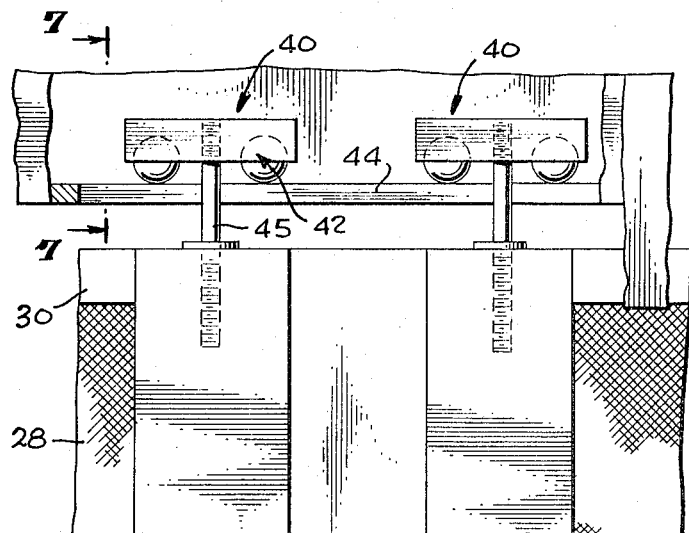
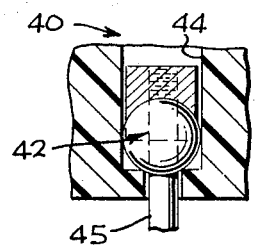
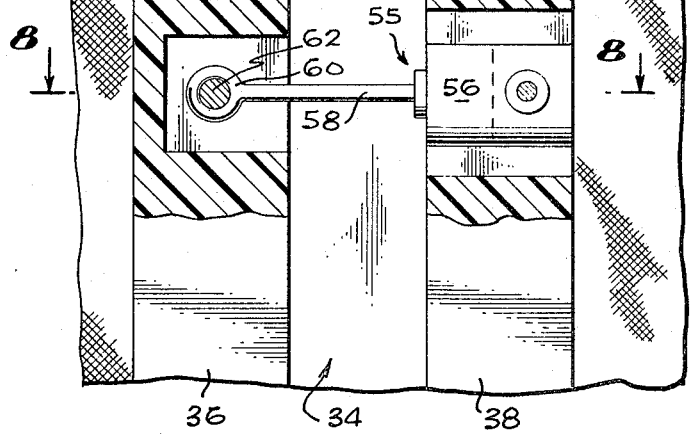
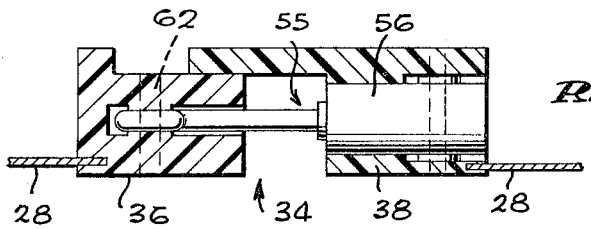
RICHARD T. PARMLEY
INVENTOR.
ATTORNEYS

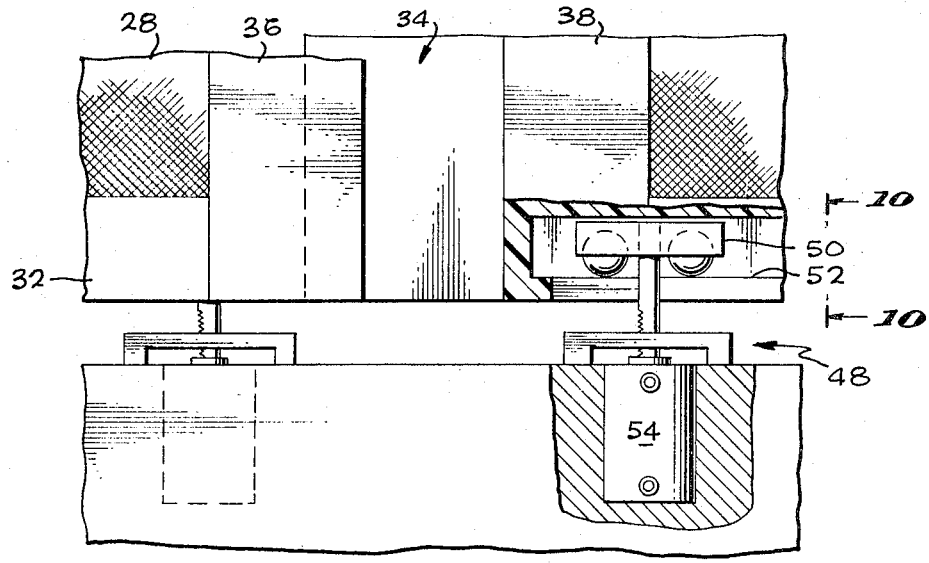
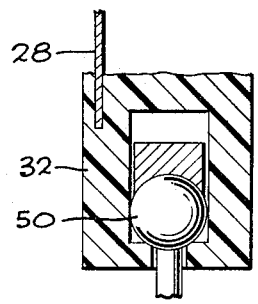
Richard T. Parmley
INVENTOR.

United States Patent Office 3,310,256
Patented Mar. 21, 1967

3,310,256
AERODYNAMIC PROTECTION FOR SPACE FLIGHT VEHICLES
James E. Webb, Administrator of the National Aeronautics and Space Administration, with respect to an invention of Richard T. Parmley, Cupertino, Calif.
Filed July 27, 1965, Ser. No. 475,299
7 Claims. (Cl. 244—1)

This invention relates in general to protective coverings for space vehicles which provide aerodynamic protection thereto and more particularly it relates to a protective covering that provides a space vehicle with a number of layers of thermal insulation surrounded by a light weight outer covering which protects the insulation during atmospheric ascent of the vehicle and functions as a meteoroid bumper for the vehicle in outer space.

A space vehicle designed to operate in outer space must be provided with insulation and a meteoroid protection system in order to operate satisfactorily and survive collisions with meteoroids and other space debris. Such systems developed heretofore, while satisfactory, have had physical characteristics which were undesirable in a space vehicle. One type of prior art device is a rigid shield fastened or secured around the outer surface of the vehicle and held in place by heavy supports. This rigid shield while functioning properly as a meteoroid bumper is undesirable in that it adds greatly to the weight of the overall vehicle and upsets the thermal balance of the vehicle due to heat conduction through the heavy supports supporting the shield. A second method or apparatus employed is to attach multilayer insulation to the outer surface of the space vehicle and secure this insulation in place with an evacuated and flexible outer covering. This second method also has an undesirable limitation in that it is very difficult to maintain a vacuum in the flexible outer cover. Loss of the vacuum during atmospheric ascent of the space vehicle will result in the bag ballooning out and being ripped from the vehicle.

A meteoroid protection system constructed in accordance with the principles of this invention, as discussed hereafter, avoids the disadvantages mentioned heretofore. This is accomplished briefly by attaching a flexible and inflatable bag or series of bags around the outer surface of the space vehicle in such manner that the section of the vehicle to be protected, as for example the fuel tank section, is surrounded by the inflatable bag or bags. A pressurizing means is mounted in the vehicle and connected to the bag for maintaining the bag at a desired degree of inflation by either pressurizing or venting the bag. The outer surface of the inflatable bag has a plurality of insulation strips attached thereto so as to provide multilayer insulation to the vehicle. These strips of insulation are attached at one end only and thus are free to expand or flutter out when not confined. A screen means is also attached to the outer surface of the space vehicle in a spaced relation from the flexible bag such that the screen means completely encompasses the inflatable bag and strips of insulation material attached thereto. Tensioning means are also provided that are designed to maintain a desired degree of tension in the screen means and take up any slack in the screen due to contraction of the tank section when filled with liquid hydrogen or other cryogenic liquid. Thus, a protective covering is provided for a space vehicle which provides insulation thereto during launching operations and flight through space. The covering also serves as a meteoroid bumper for the vehicle in an outer space environment.

It is therefore an object of this invention to provide aerodynamic protection for multilayer insulation on space vehicles.

Another object of this invention is to provide a space vehicle with a lightweight protective covering which functions as a meteoroid protector or bumper for the vehicle while in space.

A further object of this invention is to provide a space vehicle with a lightweight protective covering which functions as a meteoroid bumper and also provides substantial insulation to the space vehicle during both launch operations and flight through space.

A yet further object of this invention is to provide a protective covering that insulates the space vehicle without the added requirement of maintaining a vacuum.

These and other objects and advantages of the present invention will become more apparent when considering the following detailed description in conjunction with the accompanying drawings wherein:

FIG. 1 is a view in elevation of a space vehicle having a protective covering attached about a particular section thereof.

FIG. 2 is a view in cross section illustrating the arrangement of the component parts of the protective covering with respect to the outer wall of the space vehicle when the inflatable bag is inflated.

FIG. 3 is a broken away view similar to FIG. 2 with the inflatable bag in a deflated condition.

FIG. 4 illustrates the attachment of the insulation strips to the exterior surface of the bag.

FIG. 5 is a view taken along lines 5—5 of FIG. 2.

FIG. 6 is a view in cross section, taken along lines 6—6 of FIG. 2 that illustrates the screen tensioning means.

FIG. 7 is a view taken along lines 7—7 of FIG. 6.

FIG. 8 is a view taken along lines 8—8 of FIG. 6.

FIG. 9 is a view partially in section illustrating the attachment of the tensioning means at the lower part of the screen means.

FIG. 10 is a view taken along lines 10—10 of FIG. 9.

Referring now to the drawings, FIG. 1 illustrates a space vehicle 10 having a protective covering 12 provided around a cylindrical section thereof. The protective covering as illustrated in FIG. 1 is disposed only around the section or stage of the vehicle in which the fuel tanks are normally positioned. However, it should be understood and obvious that a protective covering constructed in accordance with the principles of this invention could be employed to protect any part of a space vehicle.

Referring now to FIG. 2, there is shown an outer load bearing wall 14 of the space vehicle and in this instance wall 14 is also the outer wall of a fuel tank. A mounting ring 16 constructed of fiberglass, fiberglass laminate or other suitable material is attached to wall 14 by bolting, adhesives or any other suitable means. A second mounting ring 18 is mounted to wall 14 in a position at the lower end of the vehicle section to be protected. The exterior surface of wall 14, between the mounting rings 14 and 18, is covered with a relatively thin layer of insulation 20 which can be a foam material or other suitable insulation. Since the wall 14 in the embodiment illustrated is the outer wall of a fuel tank the thin layer of foam is necessary to prevent air liquification on the outer surface of the tank when it is filled with liquid hydrogen prior to launch. If sections of the missile or space vehicle other than the tankage section are being protected this layer of insulation will not be necessary.

A flexible bag 22 is suitably attached to the insulation in such a manner that it completely surrounds the area of the missile defined by the mounting rings 16 and 18. If desired, low density fiberglass batting (not shown) could be placed inside bag 22 as a substitute for the layer of insulation on wall 14. A conduit 24 formed in mounting ring 16 is connected to the inflatable bag and the conduit is also connected to a suitable differential pressure transducer 25 that maintains bag 22 at a desired level of inflation. The pressure transducer functions to either pressurize or vent the bag as conditions encountered make desirable.

A plurality of insulation strips 26, see FIG. 4, are attached to the exterior surface of bag 22 to provide multi-layer insulation to the vehicle. Strips 26 are composed of aluminized sheets of Mylar, H film, or other suitable material and they are attached to the outer surface of the bag in a shingled fashion. The insulation strips may also be attached to the screen or mesh rather than to the bag. This would be desirable with smaller diameter vehicles to prevent excessive crinkling and folding of the insulation strips.

A screen 28 composed of sintered wire mesh, fiberglass or other suitable material is attached to the space vehicle and arranged such that it is substantially flush with the outer surface of the space vehicle. Screen 28 in the embodiment illustrated is substantially cylindrical and the upper peripheral end of the cylinder is secured in a split ring or frame member 30 composed of fiberglass or fiberglass laminate. The lower end of the screen is likewise secured in a similar second frame member 32. In order to permit circumferential adjustment of screen 28 the screen has a longitudinal slit or separation therein, indicated at 34 in FIG. 1 and FIG. 6. Each end of screen 28 formed by slit or separation 34 is secured to vertical frame members 36 and 38, also composed of fiberglass or fiberglass laminate, which are attached to the ends of frame members 30 and 32 so as to form a frame around the edges of screen 28.

The upper end of screen 28 is held in place by a plurality of support devices 40 which are slideably mounted in mounting ring 16 and threadably attached to frame members 36 and 38 (FIG. 6) or frame members 30 and 32 (FIG. 6). Support means 40 includes a ball bearing assembly 42 slideably disposed in arcuate slot 44 formed in mounting ring 16 and a stem portion 45 having one end thereof threaded into ball bearing assembly 42 and the other end threaded into the frame around the screen.

Referring now to FIG. 9 wherein the method of attaching the lower end of screen 28 to the space vehicle is illustrated. The lower end of screen 28 is adjustably attached to the space vehicle by a plurality of tensioning devices 48. The tensioning devices are employed to take up any slack in screen 28 that results from contraction of tank wall 14 when the vehicle is fueled with liquid hydrogen or other cryogenic liquid. Tensioning devices 48 include a ball bearing assembly 50 that is slideably mounted within an arcuate slot 52 formed in frame member 32. The tensioning device 48 also includes an actuator 54 capable of applying a predetermined amount of force to ball bearing assembly 50 and framework 32, by means of moveable rod 53, and thus tension screen 28. The internal details of actuator 54 are not disclosed herein since there are various pneumatically or electrically operated devices which will adequately perform this function. The actuator may include a mechanical locking arrangement to lock the actuator in position after tension has been applied to the screen. Such a locking arrangement would be desirable for reliability reasons, however, any such locking arrangement must be capable of being released on signal to permit the screen to go slack.

A plurality of tensioning devices 55 (see FIG. 6), which are similar to tensioning devices 48, are employed or connected between the vertical frame members 36 and 38 so as to apply circumferential tension to the screen. The tensioning device 55 includes an actuator 56 mounted in frame member 38 and a rod 58 that extends from the actuator and terminates in an eyelet portion 60 which is secured to framework 36 by a stud 62.

The operation of the invention on a space vehicle will be described, assuming that the vehicle has been fueled and is ready for launch. Pressure within the inflatable bag will be brought to approximately 16.5 p.s.i.a., approximately 1.8 p.s.i. above atmospheric pressure which is 14.7 p.s.i.a. As a result of this pressure differential the flexible bag will expand and press insulation strips 26 against screen 28, as illustrated in FIG. 2, thus transmitting a pneumatic load to the outer screen and rigidizing it. This loaded condition will prevent the compressed insulation strips and wire screen from fluttering under aerodynamic loads as the space vehicle travels along it's upward trajectory through the earth's atmosphere. As the space vehicle ascends through the atmosphere the differential pressure in the bag will increase because the atmospheric pressure is continually dropping with altitude. The differential pressure transducer 25 functions during this period to vent the bag and maintain the differential pressure between the bag and the ambient atmosphere at approximately 1.8 p.s.i. It should be noted that the pressure values mentioned above are only typical and will vary depending on vehicle design.

If means for venting the bag were not provided then the screen would have to be made substantially stronger and heavier in order to withstand the increase in pressure differential between the bag and the ambient atmosphere during ascent of the vehicle through the atmosphere. Once the vehicle is outside the atmosphere pressure within the bag is vented and the bag collapses to a position illustrated in FIG. 3. When the bag is deflated the insulation strips are free to expand and flutter in an uncompressed state within the area between the bag and the screen and gas trapped between the strips or layers of insulation will vent through the screen to space. Optimum insulation is obtained in this condition since the insulating qualities of multilayer insulation reaches its lowest thermal conductivity value in an evacuated and uncompressed state. The wire mesh screen which will remain under a predetermined amount of tension or be permitted to go slack, as desired, serves as a meteoroid bumper while the vehicle is in outer space.

This completes the detailed description of the invention. While only a preferred exemplary embodiment of the invention has been described it should be understood that there will be many changes and modifications thereto which can be made without departing from the spirit and scope of this invention as defined in the appended claims.

What is claimed is:

1. A protective covering for a space vehicle that provides insulation and meteoroid protection thereto, said covering comprising:
   (a) an inflatable bag mounted on the exterior of said vehicle,
   (b) means connected to said bag for maintaining the bag at a desired degree of inflation,
   (c) a plurality of flexible insulation strips attached at one end thereof to the exterior of said bag, and
   (d) a perforated and flexible shielding means mounted to said vehicle around said bag and insulation strips.

2. A space vehicle that includes a flexible covering for providing insulation and meteoroid protection to the vehicle; said covering comprising:
   (a) an inflatable bag encircling at least a portion of said vehicle and attached thereto,
   (b) means mounted in said vehicle and in communication with said bag for maintaining a desired pressure therein,
   (c) a plurality of insulation strips attached at one of their ends to the exterior of said bag,
   (d) a screen means attached to said vehicle that encircles said bag and insulation strips, and
   (e) means connected between said screen means and said vehicle for applying a predetermined tension to said screen means.

3. A space vehicle with at least one section thereof covered with a protective covering that provides insulation and meteoroid protection to the vehicle, said protective covering comprising:

(a) an inflatable bag attached to the outer periphery of said vehicle so as to completely cover a section of the vehicle to be protected, (b) means mounted on said vehicle and in communication with said bag for maintaining said bag at a desired degree of inflation, (c) a plurality of flexible insulation strips attached to the exterior of said bag, (d) a flexible shielding means attached to said vehicle and encircling the bag and insulation strips, said shielding means being disposed substantially flush with the exterior surface of the vehicle, and (e) means connected between said shielding means and said vehicle for applying a predetermined tension to said shielding means.

4. A space vehicle having a shielding and insulating assembly mounted thereon for providing aerodynamic protection to a substantially cylindrical section of the vehicle, said assembly comprising:

(a) mounting rings secured around each end of said cylindrical section, (b) an inflatable bag attached to said cylindrical section for covering the area of said cylindrical section between said mounting rings, (c) a plurality of insulation strips attached at one of their ends to the exterior of said bag, (d) screen means disposed around said bag and insulation strips, said screen means being attached to said mounting rings, and (e) means connected between said mounting rings and said screen means for maintaining a predetermined amount of tension in said screen means.

5. A space flight vehicle comprising:

(a) a cylindrical casing that forms an exterior wall for a section of said vehicle, (b) a first support ring encircling one end of said cylindrical casing and attached thereto, (c) a second support ring encircling the other end of said cylindrical casing and attached thereto, (d) an inflatable bag means attached to and covering said cylindrical casing, (e) means mounted in said vehicle and in communication with said bag to maintain said bag at a desired degree of inflation, (f) a plurality of flexible insulation strips attached to the outer surface of said bag in a shingled relation, (g) a cylindrical screen means disposed around said bag and insulation strips and attached to each end thereof to said support rings, and (h) tensioning means connected between said screen means and said support rings for maintaining a desired tension in said screen means.

6. The space vehicle recited in claim 5 wherein:

(a) a layer of foam material is applied to said cylindrical casing in the area between said first and second support rings to provide insulation therefor, and (b) said inflatable bag is disposed around said layer of foam.

7. The space vehicle recited in claim 5 wherein:

(a) said screen means includes a cylindrical screen having a longitudinal slit therein and the peripheral edges of said screen are secured in a fiberglass frame.

References Cited by the Examiner

UNITED STATES PATENTS

| 2,941,759 | 6/1960 | Rice et al. | 244—17 |
| 3,138,009 | 6/1964 | McCreight | 62—315 |
| 3,285,460 | 11/1966 | Parmley | 220—9 |

References Cited by the Applicant

UNITED STATES PATENTS

| 2,937,597 | 5/1960 | Winn et al. |
| 3,004,735 | 10/1961 | Kinard. |
| 3,053,476 | 9/1962 | Mohar. |
| 3,103,887 | 9/1963 | Nepple. |

FERGUS S. MIDDLETON, *Primary Examiner.*